W. BRANDENBURG & D. J. BARKER.
COOK STOVE.
APPLICATION FILED JULY 1, 1913.

1,138,622. Patented May 11, 1915.

Witnesses.
N. R. Tyndall.
E. P. Hall.

Inventor.
W. Brandenburg.
D. J. Barker.
BY J. Edward Maybee.
ATTY.

UNITED STATES PATENT OFFICE.

WILLIAM BRANDENBURG AND DAVID JOHN BARKER, OF PICTON, ONTARIO, CANADA.

COOK-STOVE.

1,138,622. Specification of Letters Patent. Patented May 11, 1915.

Application filed July 1, 1913. Serial No. 776,856.

*To all whom it may concern:*

Be it known that we, WILLIAM BRANDENBURG and DAVID J. BARKER, of the town of Picton, in the Province of Ontario, Canada, have invented new and useful Improvements in Cook-Stoves, of which the following is a specification.

This invention relates to improvements in the ovens of cook stoves and our object is to devise a construction which will enable the oven to be heated with less fuel and more uniformly than is possible with the ordinary oven construction.

We attain our object by exposing the fireback of the stove to the interior of the oven and by securing in the oven a shield spaced from the fireback to form an air flue, preferably extending part way along the top of the oven. This shield protects the contents of the oven from the direct heat of radiation and causes a circulation of the heated air which gives an equable temperature at all parts of the oven.

Figure 1:
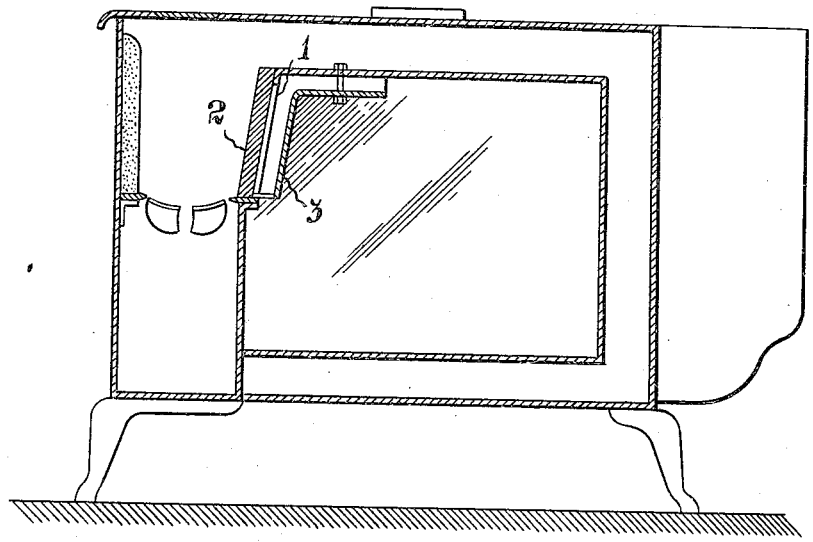
Figure 2:
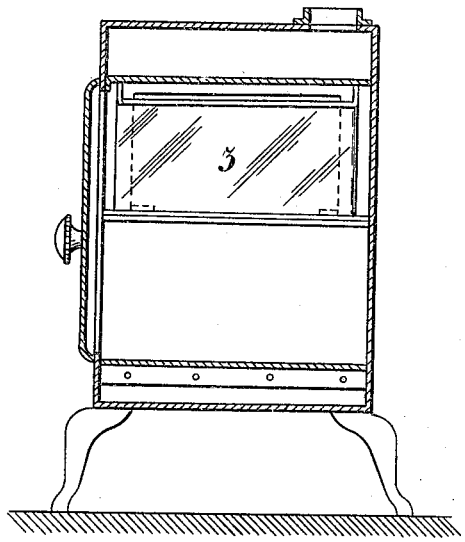
Figure 3:
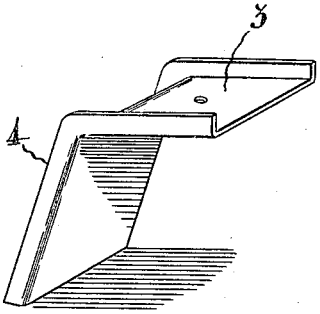

Figure 1 is a longitudinal section of a stove constructed in accordance with our invention. Fig. 2 is a cross-section of the same through the oven, looking toward the fire box. Fig. 3 is a perspective view of the shield.

In the drawings like numerals of reference indicate corresponding parts in the different figures.

The stove, it will be noted, is the same in its main features as stoves of ordinary construction, and parts not immediately connected with the present invention will not be specifically referred to. Suffice it to say that 1 is the oven front and 2 the fire back of the fire box. Ordinarily the oven front is extended up to the top of the oven, and the fire box and oven front are usually constructed so that very little heat is radiated directly into the oven from the fire box.

In the stove constructed in accordance with our invention the oven front is cut away, as shown, behind the fire box so as to expose the fire back, and this fire back will usually be made of cast metal, so that it will readily conduct the heat from the fire box. While this is the preferred construction it will, of course, be understood that any construction by which the upper part of the oven front behind the fire box is adapted to readily conduct heat would answer the purposes of our invention. The intense heat thus obtained at the upper front of the oven would result in different parts of the oven having different baking effects, and to secure an equable heating effect we provide the shield 3 spaced from the oven front, so that air may circulate between it and the oven front or the back of the fire back. This shield is also preferably extended a short distance backward beneath, and spaced from the oven top, and is also preferably provided with the sides 4, whereby it is formed as a flue. The air in this flue is strongly heated by the fire back and a rapid circulation results, the heated air traveling around the oven and creating an equable temperature therein. The shield is preferably made of cast metal, though any other material may be employed.

What we claim as our invention is:

A cook stove having the oven front partly cut away to expose the fire back, and having an integral casting located in the oven of L-shape with side flanges and secured in place to form an L-shaped flue spaced from the oven front and top and extending only part way down the front and part way toward the back of the oven.

Toronto this 10th day of June, 1913.

WILLIAM BRANDENBURG.

Witnesses as to signature of William Brandenburg:
J. EDW. MAYBEE,
E. P. HALL.

Trenton, Ont., this 13th day of June, 1913.

DAVID JOHN BARKER.

Witnesses as to signature of David J. Barker:
H. COLBOURN,
C. L. HAWLEY.

Copies of this patent may be obtained for five cents each, by addressing the "Commissioner of Patents, Washington, D. C."